Patented May 9, 1944

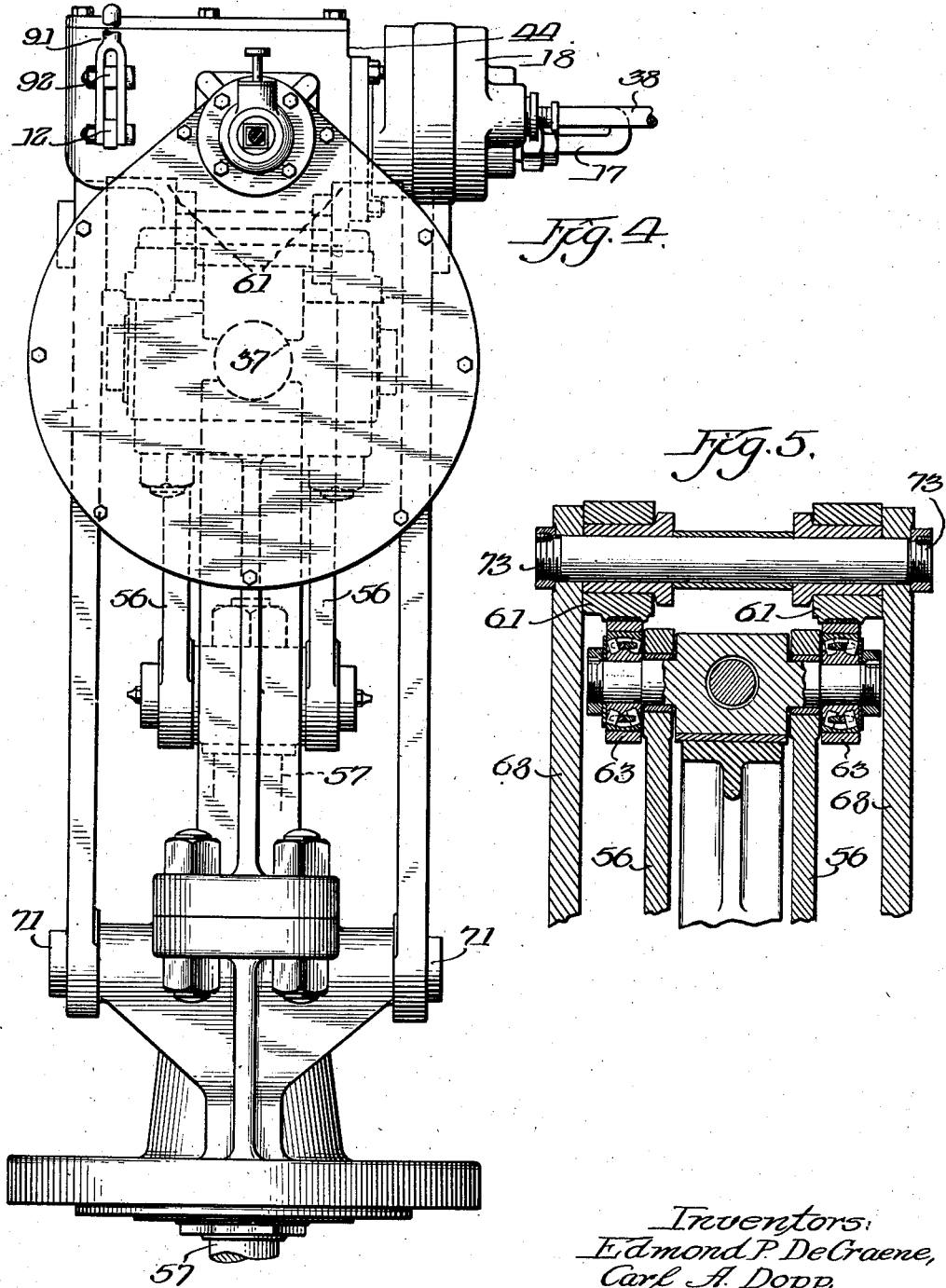

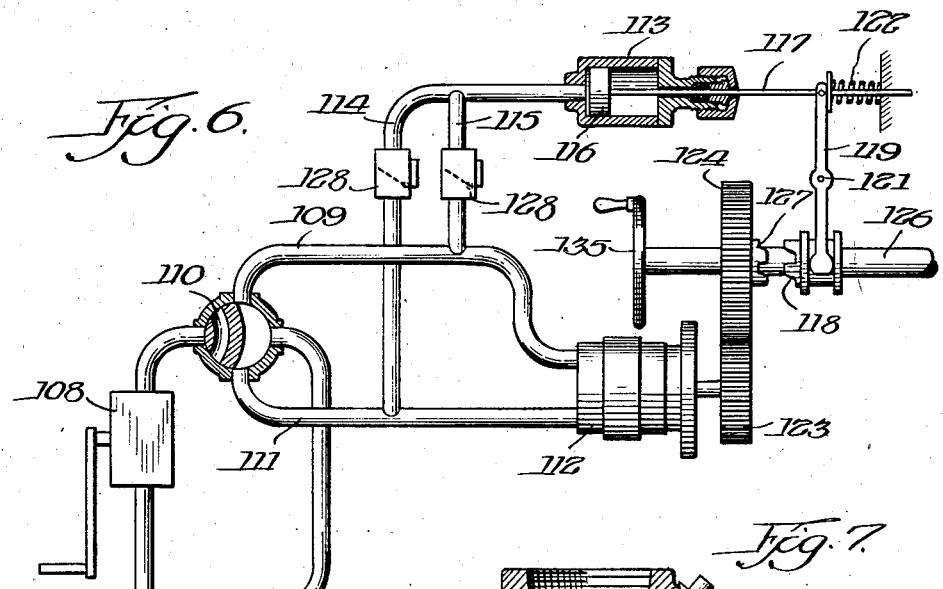

2,348,460

UNITED STATES PATENT OFFICE 2,348,460

COMBINED HAND AND HYDRAULIC VALVE OPERATOR

Richard Fennema, Edmond P. De Craene, and Carl A. Dopp, Chicago, and Frederick R. Venton, Elmhurst, Ill., assignors to Crane Co., Chicago, Ill., a corporation of Illinois Application August 19, 1941, Serial No. 407,472

11 Claims. (Cl. 74—472)

This invention relates to a new and improved combined hand and hydraulic valve operator wherein a principal object of the device is the provision of a remote controlled valve operator which may open or close the valve regardless of the position it may be in at the outset due to hand operation or hydraulic motor operation.

An important object of this invention is to provide a hydraulic means of operation for a large valve in combination with the hand operating mechanism and means for employing either the hydraulic method of operation or the hand method of operation regardless of which method was originally used.

Another important object of this invention is the provision of an automatic clutch operating in conjunction with the remotely controlled hydraulic means of operation, and upon actuation of the remote control in either of two selected positions the clutch automatically operates to effect either the lifting or the lowering of the valve disc.

Another and still further important object of this invention is the provision of a novel cylinder having a reversing piston that automatically acts to engage a clutch upon movement of the piston.

Other and further important objects of this device will be apparent from the disclosures in the following specification and accompanying drawings, in which Fig. 1 is a diagrammatic view showing the essential elements of this hydraulic valve operator.

Fig. 4 is a partial end view of the device as shown in Fig. 3.

Fig. 5 is a sectional view of the device taken on the line 5—5 of Fig. 3.

Fig. 6 shows a modified form of the invention in a diagrammatic view similar to Fig. 1.

Fig. 7 shows a check valve to be incorporated in the device shown in Fig. 6.

Fig. 8 shows a modified but preferred form of clutch disengaging mechanism.

Figure 1:
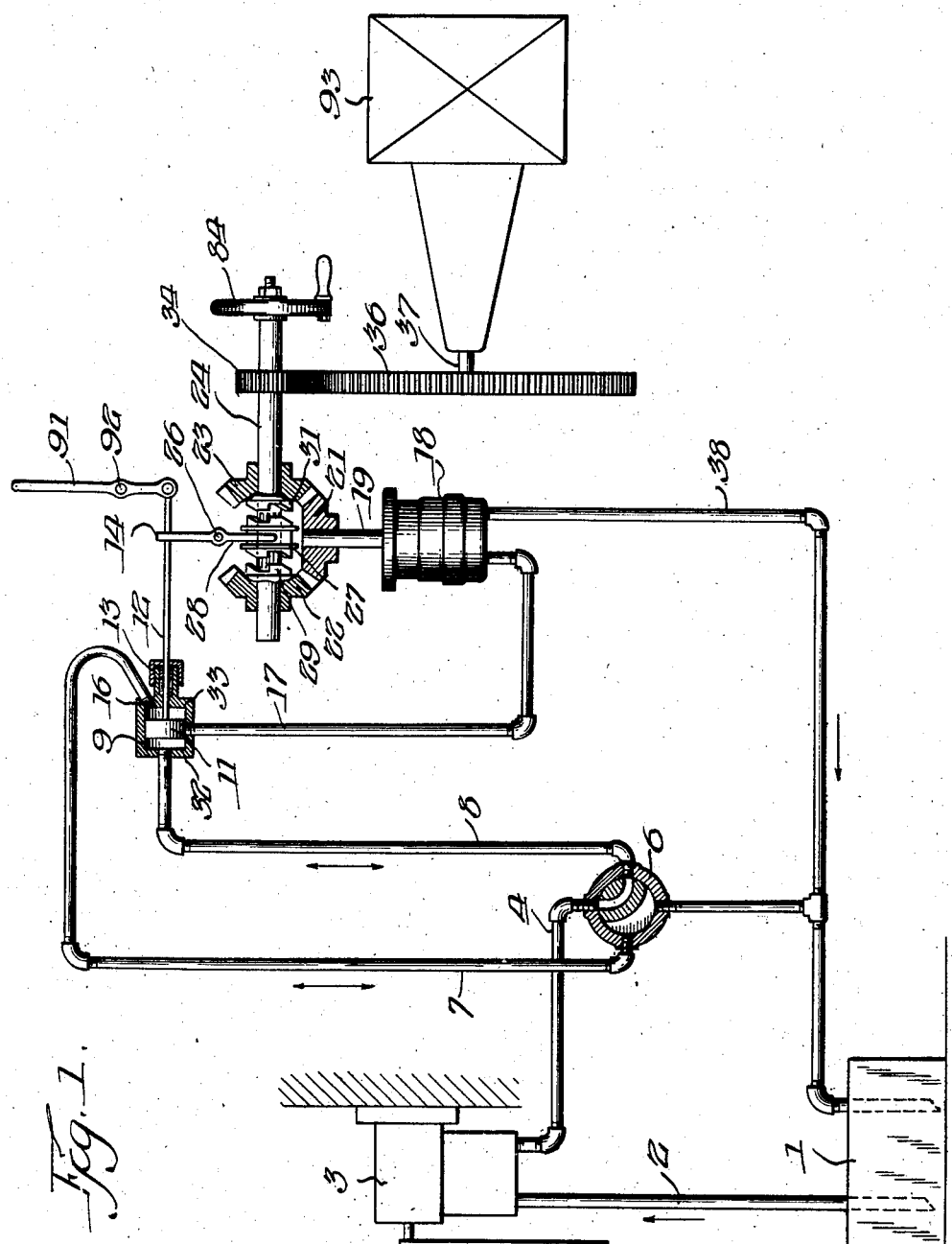

As shown in the drawings: The reference numeral 1 indicates generally a supply or reservoir of hydraulic fluid having a pipe 2 connected to a hand or motor driven pump 3 for supplying the fluid under pressure through the pipe 4 to the four-way valve 6. This four-way valve may be of the plug type or may be a sliding type valve. Regardless of which type of valve is used it is possible to selectively direct the flow of hydraulic fluid under pressure to one of the conduits 7 or 8 and permit return of fluid to the reservoir through the other conduit. The conduits 7 and 8 enter opposite ends of a cylinder 9 in which the piston 11 slides. The piston 11 is equipped with a piston rod 12 suitably journaled in a stuffing box 13 and operatively connected to the arm 14. Assuming that the hydraulic fluid under pressure is directed to the conduit 7 by operation of the valve 6, it enters the cylinder 9 at 16 thus forcing the piston 11 to the end 32 of the cylinder. This movement of the piston uncovers an opening leading into the conduit 17 and passage of fluid from the cylinder 9 to the fluid motor 18 is thereby permitted. The occurrence of events is similar when the flow of fluid is directed through the conduit 8, except that the piston is reversed and goes to the opposite end 33 of the cylinder 9. In both instances, however, the moving of the piston 11 causes an opening of the conduit 17 and the resulting flow of fluid induces an immediate operation of the fluid motor 18 which may be of the non-reversing type. This fluid motor 18 operates in one direction for opening and closing of the valve. The shaft 19, rotatably operated by the fluid motor 18, gives rotary motion to the beveled pinion 21 which in turn engages a pair of beveled gears 22 and 23, both mounted in the gear housing 44. The arm 14 is pivoted at 26 and slidably moves the interlocking type clutch 27 by its depending shank 28. The clutch has a central member which is slidably splined or keyed to the shaft 24 and rotates therewith. Upon operation of the motor 18 the beveled pinion 21 rotates the beveled gears 22 and 23 in opposite directions. It is possible therefore, by engaging one or the other of these beveled gears 22 or 23 to obtain either clockwise or counterclockwise rotational movement of the shaft 24. The slidable clutch member automatically engages either of the mating clutch faces 29 or 31 of the beveled gears 22 or 23 and causes rotation of the shaft 24 in one direction or the other, depending on which set of clutch teeth is engaged. When the fluid is forced through the conduit 7, the piston 11 travels to the end 32 of the cylinder 9 effecting engagement of the clutch with the beveled gear 23 inasmuch as the arm 14 is pivoted at 26. When, however, the fluid is directed through the conduit 8 the piston 11 travels to the end 33 of the cylinder 9 causing the slidable member of the clutch 27 to engage with the clutch face 29 of the beveled gear 22. The rotation of the shaft 24 can therefore be immediately reversed at will upon the operation of the valve 6. A spur gear pinion 34 is keyed to the shaft 24 and engages the larger gear 36 for operation of the valve (shown diagrammatically at 93) through the shaft or stem 37. It should be noted that the circuit in Fig. 1 being schematically illustrated, the position of the valve as shown is merely for purpose of convenience. This particular type of gearing arrangement permits opening and closing of large size valves without the least difficulty because of the mechanical advantage gained. After the fluid has passed through the fluid motor 18 it is returned via the conduit 38 to the reservoir 1 for further use in the operation of the valve by hydraulic means.

Figure 2:
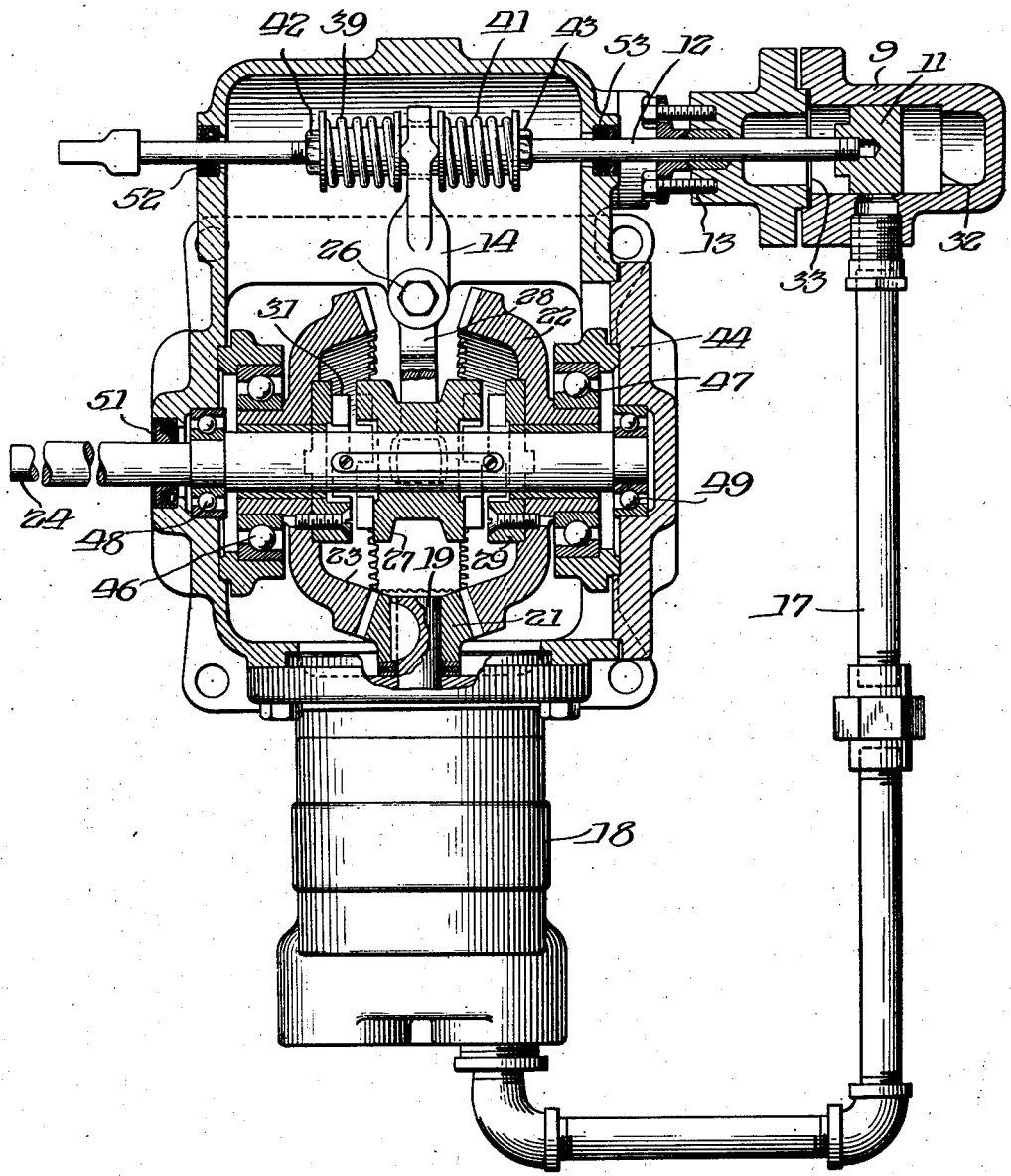
Fig. 2 is an assembly view in partial section showing the novel clutch arrangement.

As best shown in Fig. 2, the piston rod 12 is equipped with springs 39 and 41 held in position by the nuts 42 and 43, respectively. The springs 39 and 41 are placed on opposite sides of the arm 14. When the clutch 27 is forced into contact with the clutch surfaces, either 29 or 31, they do not always mate immediately and it is necessary to allow the particular beveled gear to rotate until such time as the clutch surfaces match, allowing them to completely engage. If it were not for the springs 39 and 41, the piston 11 would be allowed only very slight movement in case the mating clutch surfaces should not be initially aligned and hence would prevent sufficient fluid from flowing through the pipe 17 to the motor due to the fact that the cylinder orifice leading into the pipe 17 would not be sufficiently uncovered; thus the motor would not operate to rotate the beveled gears. Such an occurrence would cause complete inoperativeness of the device because the eventual mating of the clutch surfaces is dependent upon rotation of the beveled gears during the mating period which is dependent upon operation of the motor which is in turn dependent upon the flow of fluid through the conduit 17, and if this conduit 17 cannot be opened by a movement of the piston 11, operation ceases immediately or fails to occur. The springs 39 and 41 therefore permit the piston rod 12 and the piston 11 to be moved completely regardless of whether the clutch surfaces match immediately or not.

As shown in Fig. 2, the pair of beveled gears 22 and 23, the beveled pinion 21, and the clutch 27 and its operating mechanism are all enclosed within the housing 44. The shaft 24 is equipped with bearings 48 and 49 and an oil seal 51; the beveled gears are equipped with bearings 46 and 47. For smooth, quiet operation the housing 44 is filled to a desired level with a lubricant. Oil seals 52 and 53 are positioned around the piston rod 12 at its entrances into the housing 44.

Figure 3:
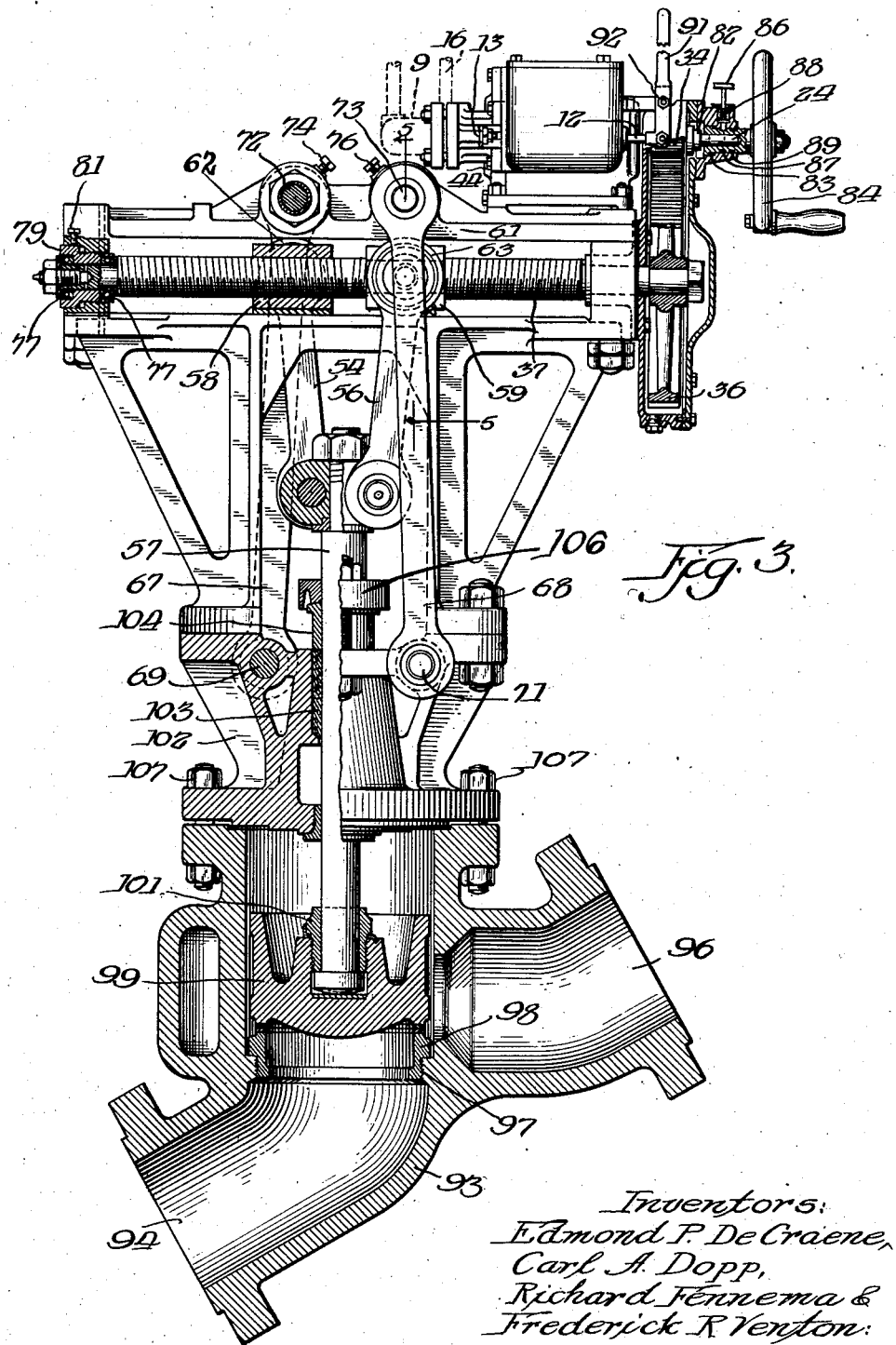
Fig. 3 is a sectional view showing the adaptation of the hydraulic and hand operating means associated with the valve.

Fig. 3 shows the toggle shaft 37 operated by the gear 36. Half of the stem or shaft 37 is threaded with right hand threads and the other half threaded with left hand threads. Pairs of toggle arms 54 and 56 as shown in Figs. 3, 4 and 5 are pivotally attached at their lower ends to the stem 57 of the valve to be operated. The upper ends of the toggle arms 54 and 56 are equipped with screw threaded blocks 58 and 59 respectively, for threaded engagement with the shaft 37. Upon rotation of the toggle shaft 37 the toggle arms move inwardly or outwardly, depending upon the direction of rotation. The valve to be operated has the customary body 93 having ports 94 and 96, the seat 97 with the renewable seat ring 98, the disc 99, the disc stem ring 101, the bonnet 102, the packing 103, the packing gland 104 and the gland follower 106. The bonnet 102 is bolted to the body 93 by the bolts 107. When the toggle arms move outwardly the stem 57 of the valve is raised, thus lifting the closure member 99 from its valve seat. When the toggle arms 54 and 56 move inwardly along the toggle shaft 37, the stem 57 of the valve to be operated is moved downwardly and the closure member 99 is moved to its seat. The screw threaded blocks 58 and 59 do not frictionally contact the upper tracks 61 because the movable toggle arms 54 and 56, as best shown in Fig. 5, have roller bearings at their upper ends for rolling contact with the tracks 61. These roller bearings, namely pairs 62 and 63, reduce friction to a minimum. The entire load of seating the valve disc is transmitted to the tracks 61 and in turn to tie rods 67 and 68 attached to the bonnet. These tie rod pairs 67 and 68 are fixedly positioned to the bonnet at 69 and 71 respectively, and are bolted to the tracks 61 at 72 and 73. Inasmuch as the tracks 61 must be a fixed distance above the shaft 37 in order that the tracks receive the load instead of the toggle shaft 37 when the valve is being closed, pairs of eccentric bushings are employed at the connecting points 72 and 73 of the tie rods 67 and 68 so that adjustment may be made in the length of the tie rods to secure this desired predetermined distance between the shaft 37 and the tracks 61. After the eccentric bushings at 72 and 73 are properly adjusted they are affixed in that position by the pairs of set screws 74 and 76.

Another important requirement of this device is to have the toggle arms 54 and 56 adjusted at similar opposing angles to the stem 57 of the valve to be operated. This requirement must be met in order to obtain proper vertical movement of the stem 57. If these toggle arms 54 and 56 were at an unequal angle with the stem 57, an uneven amount of force would be exerted on the stem 57 causing misalignment of the stem, preventing proper seating and unseating of the valve closure member. After the toggle arms 54 and 56 have been adjusted to the proper angle on the shaft 37 it is then very important to prevent the shaft 37 from shifting its position relative to the center of the valve to be operated, and to this end thrust bearings 77 are employed at one end of the shaft 37. An adjustment bushing 79 is utilized to properly center the toggle shaft 37, and when it is in the right position it is locked by the set screw 81.

The handwheel 84 is attached to the shaft 24 and is permitted to rotate with the motor, or if desired, the handwheel may be disengaged when the motor is operating the valve as per the following. The shaft 24 driving the spur gear pinion 34 has a protruding clutch face 82 which is adapted to engage the opposing clutch face 83 integrally attached to the handwheel 84. The handwheel 84 is normally prevented from engaging the clutch 82—83 by the spring-impelled plug 86 which engages the peripheral slot 87. When it is desired to operate the valve by hand the plug 86 is pulled upwardly against the force of the spring 88 and the handwheel 84 is pushed inwardly until the clutch face 83 engages the clutch face 82. At this point the spring-impelled plug 86 is directly opposite the annular slot 89 into which it drops, holding the handwheel in operative engagement with the spur gear 34. Thus upon rotation of the handwheel 84 the spur gear pinion 34 is rotated and in turn rotates the gear 36 which has keyed thereto the toggle shaft 37. It is therefore apparent that this valve can be operated hydraulically from a remote position or locally by means of the handwheel, depending upon the will of the operator.

As best shown in Figs. 3 and 4, the piston rod 12 has an extension beyond its connection with the lever 14 which is for the purpose of shifting its transverse position by the hand lever 91 pivoted at 92. When the valve is operated hydraulically the clutch engages either of the beveled gears 22 or 23 and hence before the valve can be operated by hand the clutch must be disengaged. This disengagement is accomplished by the lever 91. A mere movement of this lever 91 to a vertical position puts the clutch 27 in a central or neutral position allowing the handwheel 84 to be operated without interference from the motor. Fig. 8 shows a modified but preferred form of means for returning the clutch to a neutral position at all times when the motor is not in operation. The device as shown in this Fig. 8 automatically returns the clutch to a neutral position whereas in the other figures of the drawings the clutch is disengaged only by manual operation on the lever 91. To gain this automatic return of the clutch to a neutral position we provide that the shaft 12 shall be made continuous throughout and not divided as shown in Fig. 2. However, the shaft 12 is provided with an annular shoulder 131 for the purpose of enabling the spring collar 132 to move therewith. A spring 133 is normally compressed between this collar 132 and the collar 134 which is adapted to act against one of the upper sides of the clutch lever 14. The collar 132 is in spring-pressed engagement with the housing 44. Another spring 136 counter-balances the spring 133 and has collars 137 and 138 respectively, similar to the collars 134 and 132. These springs 133 and 136 are of equal length and strength. Inasmuch as the clutch lever 14 may not be exactly centered in the housing 44, a spacer 139 may be employed between the housing 44 and the spring collar 138 so that when there is no outside force exerted upon the springs 133 and 136 they normally hold the clutch lever 14 in a vertical or neutral position. A sleeve 141 is adapted to fit over the shaft 12 in order to obtain a shoulder 142 similar to the shoulder 131 for holding or maintaining the spring collar 138 in slidable relationship with the shaft 12. This sleeve 141 is adjustably positioned by the nut 143 which is screw threaded onto the shaft 12.

In operation, the automatic declutching mechanism works as follows: The shaft 12 is automatically moved by the piston 11 of the cylinder 9, and assuming that fluid is directed to the end 32 of the cylinder 9, the piston 11 is forced to the end 33 of the cylinder thereby moving the piston rod or shaft 12 through the housing 44. This action causes the spring collar 132 to move because of the annular shoulder 131 on the piston rod thus relaying the force through the spring 133 to the clutch lever and resulting in engagement of the clutch 82—83. However, if the clutch surfaces do not immediately mate, a compression of the spring 133 occurs and allows for full movement of the piston 11 thereby uncovering the conduit 17 and permitting the fluid motor to operate. As soon as the clutch faces do mate, the lever 14 is tilted because of the expansion of the spring 133 causing the clutch 27 to engage the gear 22. The spring 136 is also compressed when the spring 133 expands and as the collar 132 has moved, the springs are subjected to a new center. Now when fluid is forced through the conduit 7 and enters the end 33 of the hydraulic cylinder 9 the piston 11 and its associated piston rod or shaft 12 is forced to the end 32 of the valve thus causing the piston rod 12 to emerge from the casing or housing 44. The result is that the sleeve 141 contacts the spring collar 138 and compresses the spring 136 providing of course that the clutch does not immediately mate with the clutch 31 on the gear 23. The same operation then takes place as described for the opposite side. The piston rod has been allowed to move its full distance because of the compression of the spring 136 thus opening the port to the conduit 17 and permitting the motor to operate. The clutch faces of the clutch 27 and the gear 23 will soon become aligned and when this occurs the spring 136 will be allowed to expand to the point where the spring 133 counteracts its expansion thus tilting the lever 14 and engaging the beveled gear 23. It will be readily seen that this automatic clutch neutralizing device is very desirable in making this system of valve operation entirely automatic. It is preferable that the hand lever 91 be maintained in the system in the event something should go wrong with the automatic mechanism and it is necessary to move the clutch by hand.

As shown in the modified form of the device as in Fig. 6, the reference numeral 108 signifies a pump having a source of fluid supply 120. Pipes or other conduits 109 and 111 lead from the source of fluid supply under pressure to a reversing fluid motor 112. For the purpose of obtaining a clearer understanding of the operation of the device it will be assumed that the pipe 109 leading into the fluid motor 112 causes a clockwise rotation of the said motor and it will also be assumed that the pipe 111 leading into the fluid motor 112 causes a counter-clockwise rotation of the said motor. The hydraulic cylinder 113 is so positioned that fluid will act to operate it regardless of whether the fluid is being pumped to the motor 112 through the pipe 109 or 111. The fluid is bypassed from the line 109 to the hydraulic cylinder 113 through the conduit 115 and similarly the fluid is bypassed from the line 111 to the hydraulic cylinder through the conduit 114. In contradistinction to the previously described cylinder 9, this hydraulic cylinder 113 is operated solely from one end, and the piston 116 and its piston rod 117 is expelled outwardly, regardless of whether the fluid under pressure is bypassed from the line 109 or the line 111.

As in our previously described structure, this hydraulic valve automatically operates a clutch 118 which has a lever arm 119 mounted on the top thereof. The piston rod 117 is connected directly to this lever arm 119 and the said lever arm is pivoted at 121. At the upper end of the lever arm 119 is a spring 122 so mounted as to normally maintain the clutch in a neutral or out-of-engagement position as shown in this Fig. 6 so that the handwheel 135 can operate the valve without turning the motor. The fluid motor 112 acts to directly operate the gear 123 whether the motor is running clockwise or counter-clockwise. Another gear, namely 124, is journally and rotatably mounted on the shaft 126, and is in operative engagement with the gear 123. The clutch 118 is mounted so as to rotate with the shaft 126 and when the fluid under pressure is allowed to pass from the pump 108 through a suitable control valve 110 through either of the conduits 109 or 111 fluid is bypassed to either of the conduits 115 or 114 causing the piston 116 and its associated piston rod 117 to move outwardly and cause the lever arm 119 to pivot around the point 121 and so engage the clutch 118 with the opposing clutch face 127 on the gear 124, thus causing rotation of the shaft 126 with its direction of rotation depending entirely upon the direction of rotation of the motor.

Similar check valves 128 are placed in the conduits 114 and 115 to prevent backflow of the bypassed fluid under pressure to the line. However, if the check valves 128 were leakproof, the piston 116 of the hydraulic cylinder 113 would be prevented from returning to its innermost position at the end of the operation because of the fluid contained within the conduits 114 and 115 between the check valves 128 and the hydraulic cylinder 113. It is our purpose to release this fluid pressure by minute holes shown at 129 in Fig. 7 in both of the check valve discs 130 so that the fluid will slowly leak back through the valve 110 to the supply reservoir 120 after the valve operator is turned off. As soon as this back pressure is eliminated the spring 122 goes into operation, forcing the piston 116 into its innermost position of the hydraulic cylinder and disengaging the clutch 118 from the gear 124.

As is readily seen, this modification performs the same function as the preferred embodiment and yet contains a good many variations from the preferred embodiment. There are undoubtedly other possible modified forms of this hydraulic operated clutch, and, therefore, we do not propose limiting the claims of this patent to one specific structure but rather to read broadly on a hydraulic operated clutch.

The valve operator of this invention is advantageous because it supplants the inefficient elongated stems formerly used on ships to obtain remote control of valves to a higher deck. In addition to this, it is used in places where electric motors are not available. This valve operator is especially adaptable to installations where there is ordinarily fluid under pressure for other uses and it can be used in lieu of the hand or motor operated pump 3 of this hydraulic operator unit. This unit may be employed on any type of valve and is not limited to the toggle type shown and described. It can be readily seen that a valve or other mechanism may be operated directly by the shaft 24, or there are numerous gear arrangements which can be operated by the shaft 24 to gain the desired mechanical advantage.

We are aware that numerous details of construction may be varied throughout a wide range without departing from the principles of our invention, and, as pointed out above, we therefore do not propose limiting the patent granted hereon otherwise than as necessitated by the prior art.

We claim:

1. A fluid motor system of the character described, the combination comprising a source of fluid under pressure, conduit means for the conveyance of fluid, a valve selectively directing flow of fluid through said conduit means, a cylinder in communication with the said conduit means and having a reversing piston, a fluid motor mounted on the said conduit means and operated by fluid flowing through the said cylinder, gears operatively connected to the said motor, a shaft rotatable in opposite directions in indirect response to fluid flow within the said conduit means, a clutch positioned intermediate to the said shaft and said motor, a portion of the said clutch being movable by the said piston for selectively engaging the said gears, the said gears including a pair of beveled gears and a beveled pinion gear, the latter member being driven by the said motor and driving the pair of beveled gears, the said shaft being operatively connected with the gears selectively.

2. A fluid motor system comprising a source of fluid under pressure, means for conveying the fluid through the system, a valve for selectively directing the flow of fluid through said latter conveyance means, a cylinder having a reversing piston in communication with the said fluid conveying means, a non-reversing fluid motor in communication with the fluid conveyance means, a plurality of gears operatively connected to the said motor, the said fluid motor being operated by fluid flowing through the said cylinder, a housing having a shaft therethrough, a clutch cooperating with the shaft and having a portion thereof movable with the said piston for engaging the said gears, the said piston being limitedly movable within the said cylinder in response to line flow, the said gears including a pair of beveled gears rotatably journaled in the said housing, a beveled gear pinion driven by the motor, the said beveled gear pinion driving the pair of beveled gears, whereby upon predetermined movement of the piston and said clutch portion in one direction the engagement of one beveled gear with the said shaft is provided to produce a clockwise rotation of the said shaft and predetermined movement of the said piston and said clutch portion in the opposite direction provides for engagement of the other beveled gear with the said shaft to produce a counter-clockwise rotation of the said shaft with the other bevel gear.

3. A fluid motor system, the combination comprising a source of fluid under pressure, conduit means for conveyance of such fluid, a multi-way valve for selective diversion of fluid in said conduit means, a cylinder communicating with said conduit means and having a reversing piston reciprocably movable therewithin, a fluid motor mounted upon said conduit means and operated by fluid flowing through the said cylinder, gears operatively connected to the said motor, a housing having a shaft journaled therewithin, a clutch movable with the said shaft and with a portion thereof movable with the said reciprocably movable piston for engaging the said gears, the said gears including a pair of beveled gears rotatably journaled in the said housing, a beveled pinion gear driven by the motor, the said beveled pinion gear driving the pair of beveled gears, whereby the engagement of said clutch portion with one beveled gear produces a clockwise rotation and engagement of the said clutch portion with the other beveled gear produces a counter-clockwise rotation of the said shaft, predetermined selective movement of the said multi-way valve causing reciprocal movement of the piston and the said clutch portion to engage one of the said beveled gears by the resultant selective engagement of the said shaft operatively with the said gears.

4. A hydraulic system comprising a source of fluid under pressure, conduit means for conveying the fluid, a cylinder mounted on the conduit means and having a reversing piston, a valve cooperating with the conduit means for directing the fluid under pressure to either end of the said cylinder to selectively move the piston reciprocably within the cylinder, a fluid motor operated by fluid flowing through the said cylinder, clutch means having a portion operatively connected to the said piston, a pair of beveled gears adjacent the clutch means, a beveled pinion gear driven by the fluid motor and engaging the said beveled gears, whereby upon predetermined movement of a portion of the clutch means with the piston the said clutch portion selectively engages either of the said beveled gears.

5. A fluid motor system comprising a source of fluid under pressure, conduit means for carrying said fluid, a valve for selectively directing the flow of fluid through the conduit means, a cylinder having ports at each end and one in between each of which communicates with the conduit means, a reversing piston reciprocably movable in the said cylinder, the movement of the said piston in either direction allowing for passage of fluid from the said intermediate port, a piston rod for the said piston, a pivotally movable lever attached to the said piston rod, a shaft rotatable in a plurality of directions cooperating with the said lever, clutch means having a clutch portion on the said shaft and having an end portion of the said lever attached thereto, the said lever being pivotably movable between the said piston rod and the said clutch portion to move the latter member into and out of engagement with the said clutch means, a housing support for the said clutch means and serving as a journaling means for the said shaft, a pair of oppositely disposed bevel gears journaled in the said housing support, a beveled pinion gear engaging both of the said bevel gears, a fluid motor in communication with the said intermediate port for driving the said beveled pinion gear, whereby upon pivotal movement of the said lever the said clutch portion is movable to engage one or the other of the said pair of bevel gears to rotate the shaft in a predetermined direction.

6. A fluid motor system comprising a fluid under pressure, conduits for conveyance of the fluid, a valve to selectively direct fluid flow through the conduits, a cylinder having ports at each end and one in the middle in communication with the conduits, a reversing piston reciprocably movable in the said cylinder whereby upon reciprocable movement of the said piston flow of fluid from the middle port is permitted, a piston rod for the said piston, a lever movable with the said piston rod, a shaft, a plurality of clutch means cooperating with the said shaft and having the other end of the said lever attached thereto, the said lever being pivotally mounted between the said piston rod and the said clutch means, a housing for support of the said clutch means and shaft, a pair of bevel gears journaled in the said housing upon the said shaft, a beveled pinion gear engaging the said bevel gears, a fluid motor connected to the middle port of the said cylinder to drive the said beveled pinion gear, another lever attached to the said piston rod movable with the latter member for providing disengagement of the said clutch means.

7. A fluid motor system comprising a fluid supply, conduit conveying means therefor, a pump to subject the said fluid within the said conveying means under pressure, a four-way valve to selectively direct the flow within the conduit means, a cylinder communicating with the conduit means and having ports at each end and one therebetween, a reversing piston slidably movable in the said cylinder, a piston rod for the said piston and movable therewith, a shaft selectively rotatable in opposite directions upon predetermined movement of the said piston, clutch means predeterminedly movable with the said shaft to provide for the selective rotation of the latter member, a lever respectively attached to the said piston rod and a portion of the said clutch and pivoted therebetween, a housing for support of the said clutch means and the shaft, a pair of beveled gears mounted on the said shaft and journaled in the said housing, a beveled pinion gear engaging the said beveled gears, a fluid motor directly connected to the said beveled pinion gear to enable the latter member to drive the said beveled gears, the said fluid motor being driven by the fluid from the intermediate port in the said cylinder, an additional lever cooperating with the said piston rod for moving it transversely, the said latter mentioned lever being manually operable for disengaging the said clutch portion from the clutch means.

8. A fluid motor system comprising a source of fluid under pressure, a non-reversible fluid motor therefor, a cylinder cooperating with the fluid motor and having ports at its end portions and one therebetween, a piston slidable in said cylinder, conduits communicating with the end ports of the said cylinder, another conduit connecting the said intermediate port with the said fluid motor, gears adapted to engage a member to be driven, clutch means including a clutch portion movable with the said piston to selectively engage the said gears, means cooperating with the said clutch portion to permit full movement of the said piston in the said cylinder when the clutch portion is not in immediate engagement with either of the said gears, whereby the flow through the intermediate conduit is unimpeded and the operation of the said fluid motor is substantially continuous.

9. A fluid motor system comprising a source of fluid under pressure, a non-reversible fluid motor, a cylinder having ports at its ends and one intermediate the ends, a piston slidable in said cylinder, conduits communicating with the end ports of the said cylinder, control means for the conduits, another conduit connecting the said middle port to the said fluid motor, gears adapted to engage a member to be driven, clutch means including a clutch portion arranged to move with the said piston and to selectively engage the said gears, resilient means on either side of the said clutch to permit full movement of the said piston in the said cylinder when the clutch portion is not in immediate engagement with either of the said gears, whereby the operation of the said fluid motor is not affected, means provided by the control means to permit return of fluid to its source.

10. A fluid motor system, the combination comprising a fluid under pressure, a multi-way valve therefor, a cylinder having a reversing piston, a fluid motor in communication with the said cylinder, gears operatively connected to the said motor, the said fluid motor being operated by fluid flowing through the said cylinder, a housing having a shaft therethrough, clutch means cooperating with the said shaft and having a portion operated by the said piston for engaging the said gears, the said gears comprising a pair of beveled gears rotatably journaled in the said housing, a beveled pinion gear driven by the motor, the said pinion gear driving the pair of beveled gears, the engagement of one beveled gear with said pinion gear producing a clockwise rotation of the said shaft and the engagement of the other beveled gear with said pinion gear producing a counter-clockwise rotation of the said shaft, whereby predetermined selective movement of the said multi-way valve effects movement of the piston whereupon the fluid motor is operated and the said clutch automatically engages a particular beveled gear, means for automatically returning the clutch portion to a disengaged position.

11. In a fluid motor system of the character described, the combination including a source of fluid under pressure, reservoir means connected with the source of fluid under pressure, a cylinder having ports at both ends and in the center, conduit means communicating with each end of the cylinder, a piston slidably movable in the said cylinder, a piston rod on the said piston, a valve for selectively directing the flow of fluid from the source of fluid under pressure into one of the conduit means while simultaneously connecting the other of the said conduit means with the said reservoir means, a fluid motor operated by fluid under pressure from the said center port of the said cylinder, a conduit connecting the center port of the cylinder with the said fluid motor, a shaft reversibly rotatable in response to fluid flow within the conduits, a plurality of gear means cooperating with the said shaft for obtaining clockwise and counter-clockwise rotary motion from the rotary motion received from the said motor, a clutch positioned intermediate the said shaft and motor and having a portion thereof for engaging the said gear means for effecting selectively either the clockwise or counter-clockwise rotary motion of the said shaft, the said cylinder providing for a connection between the piston-rod and a portion of the said clutch, whereby when fluid is permitted entrance to one end of the cylinder a portion of the said clutch automatically engages one of the said gear means for effecting clockwise rotary motion of the said shaft and when the fluid is permitted entrance to the other end of the cylinder a portion of the clutch automatically engages the other of said gear means for a counter-clockwise rotary motion of the said shaft.

RICHARD FENNEMA.
EDMOND P. DE CRAENE.
CARL A. DOPP.
FREDERICK R. VENTON.